(12) United States Patent
Chen et al.

(10) Patent No.: US 7,313,791 B1
(45) Date of Patent: Dec. 25, 2007

(54) FIRMWARE UPDATE NETWORK AND PROCESS EMPLOYING PREPROCESSING TECHNIQUES

(75) Inventors: Shao-Chun Chen, Aliso Viejo, CA (US); James P. Gustafson, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 776 days.

(21) Appl. No.: 10/646,324

(22) Filed: Aug. 22, 2003

Related U.S. Application Data (60) Provisional application No. 60/405,253, filed on Aug. 22, 2002, provisional application No. 60/415,620, filed on Oct. 2, 2002, provisional application No. 60/441,867, filed on Jan. 22, 2003, provisional application No. 60/447,977, filed on Feb. 18, 2003.

(51) Int. Cl.
    *G06F 9/445* (2006.01)
(52) U.S. Cl. ............... 717/170; 717/171; 717/173
(58) Field of Classification Search ......... 717/168–173
    See application file for complete search history.

(56) References Cited

U.S. PATENT DOCUMENTS

| | | | |
|---|---|---|---|
| 5,261,055 A | 11/1993 | Moran et al. ............ 395/275 |
| 5,442,771 A | 8/1995 | Filepp et al. ............ 395/650 |
| 5,479,637 A | 12/1995 | Lisimaque et al. ......... 395/430 |
| 5,579,522 A | 11/1996 | Christeson et al. ........ 395/652 |
| 5,596,738 A | 1/1997 | Pope ..................... 395/430 |
| 5,598,534 A | 1/1997 | Haas .................... 395/200.09 |
| 5,608,910 A | 3/1997 | Shimakura ............... 395/670 |
| 5,623,604 A | 4/1997 | Russell et al. .......... 395/200.1 |
| 5,666,293 A | 9/1997 | Metz et al. ............. 395/200.5 |
| 5,752,039 A * | 5/1998 | Tanimura ................ 717/168 |
| 5,778,440 A | 7/1998 | Yiu et al. .............. 711/154 |
| 5,790,974 A | 8/1998 | Tognazzini .............. 701/204 |
| 5,832,000 A * | 11/1998 | Lin et al. .............. 714/755 |
| 5,878,256 A | 3/1999 | Bealkowski et al. ....... 395/652 |
| 5,896,566 A * | 4/1999 | Averbuch et al. ......... 455/419 |
| 5,960,445 A | 9/1999 | Tamori et al. ........... 707/203 |
| 6,009,497 A | 12/1999 | Wells et al. ............ 711/103 |
| 6,038,636 A | 3/2000 | Brown, III et al. ....... 711/103 |

(Continued)

FOREIGN PATENT DOCUMENTS

CA  2339923  3/2000

(Continued)

OTHER PUBLICATIONS

R. Burns et al., "In-Place Reconstruction of Version Differences", Jul.-Aug. 2003, IEEE.*

(Continued)

*Primary Examiner*—Lewis A. Bullock, Jr.

(57) ABSTRACT

A network for updating firmware, drivers, or application software facilitates the access to generated update packages by electronic devices and the update of firmware, drivers, content or application software in a fault tolerant mode. A "Bubbles" technique is employed to generate efficient and compact update packages. A "Bubbles" information is generated employing the "Bubbles" technique that is subsequently sent to the electronic devices as part of an update package. The "Bubbles" information and other related information is used in preprocessing activities and in other update related activities. For example, they are used to prepare the electronic device for an update to a different version of its firmware, software and/or content.

33 Claims, 6 Drawing Sheets

U.S. PATENT DOCUMENTS

| | | | |
|---|---|---|---|
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,209,111 B1* | 3/2001 | Kadyk et al. | 714/747 |
| 6,212,659 B1* | 4/2001 | Zehavi | 714/755 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,832,373 B2* | 12/2004 | O'Neill | 717/171 |
| 6,925,467 B2* | 8/2005 | Gu et al. | 707/101 |
| 7,031,972 B2* | 4/2006 | Ren et al. | 707/101 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2004/0123282 A1* | 6/2004 | Rao | 717/168 |
| 2004/0194081 A1* | 9/2004 | Qumei et al. | 717/173 |
| 2004/0215755 A1* | 10/2004 | O'Neill | 709/223 |
| 2004/0267833 A1* | 12/2004 | Meller et al. | 707/200 |
| 2006/0101040 A1* | 5/2006 | Ren et al. | 707/100 |

FOREIGN PATENT DOCUMENTS

| | | |
|---|---|---|
| JP | 8202626 | 8/1996 |
| KP | 2002-0034228 | 5/2000 |
| KP | 2001-0100328 | 11/2001 |

OTHER PUBLICATIONS

B. Baker et al., "Compressing Differences of Excutable Code", Apr. 22, 1999.*

"Focus on OpenView A guide to Hewlett-Packard's Network and Systems Management Platform", Nathan J. Muller, pp. 1-291, CBM Books, published 1995.

"Client Server computing in mobile enviornments", J. Jing et al, ACM Computing Surveys, vol. 31, Issue 2 , pp. 117-159, ACM Press, Jul. 1999.

"ESW4: enhanced scheme for WWW computing in wireless communication enviornments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on WIreless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

FIRMWARE UPDATE NETWORK AND PROCESS EMPLOYING PREPROCESSING TECHNIQUES

CROSS-REFERENCE TO RELATED APPLICATIONS/INCORPORATION BY REFERENCE

This patent application makes reference to, claims priority to and claims benefit from U.S. Provisional Patent Application Ser. No. 60/405,253, entitled "Firmware Update Network And Process Employing Preprocessing Techniques," filed on Aug. 22, 2002, U.S. Provisional Patent Application Ser. No. 60/415,620, entitled "System for Generating Efficient And Compact Update Packages," filed on Oct. 2, 2002, U.S. Provisional Patent Application Ser. No. 60/441,867, entitled "Mobile Handset Update Package Generator That Employs Nodes Technique," filed on Jan. 22, 2003, and U.S. Provisional Patent Application Ser. No. 60/447,977, entitled "Update Package Generator Employing Partial Predictive Mapping Techniques For Generating Update Packages For Mobile Handsets," filed on Feb. 18, 2003.

The complete subject matter of each of the above-referenced United States patent applications is hereby incorporated herein by reference, in its entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

This application is also related to the following co-pending applications, the complete subject matter of each of which is hereby incorporated herein by reference in its entirety:

| Ser. No. | Title | Filed | Inventors |
| --- | --- | --- | --- |
| 10/646,319 | System for Generating Efficient and Compact Update Packages | Aug. 21, 2003 | Chen Gustafson Barber |
| 10/756,103 | Mobile Handset Update Package Generator That Employs Nodes Technique | Aug. 21, 2003 | Chen |
| 10/646,975 | Update Package Generator Employing Partial Predictive Mapping for Generating Update Packages for Mobile Handsets | Aug. 21, 2003 | Lilley |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

The present invention relates generally to the process of generating and distributing update packages for firmware/software upgrades. The present invention relates, more specifically, to the generation of update packages containing firmware/software version changes, the distribution of such update packages to electronic devices connected to a network, and the subsequent update process of firmware, software and/or content in electronic devices that receive the update packages.

2. Background of the Art

Electronic devices, such as mobile phones and personal digital assistants (PDAs), often contain firmware and application software either provided by the manufacturer of the electronic devices, by telecommunication carriers, or by third parties. The firmware and application software often contain software bugs. New versions of the firmware and software are periodically released to fix the bugs or to introduce new features, or both. There is a fundamental problem in providing access to new releases of firmware and software. The electronic devices are often constrained in terms of resources, such as available memory. Attempts to upgrade firmware or software by end-users often result in making the device, or some features of the device inoperable. Specifically, changing firmware in electronic devices requires a great deal of caution as unsuccessful attempts may make the device inoperable. Also, attempts to upgrade firmware and/or software in constrained devices may be hampered by limited user interaction capabilities and slow communication speeds on these devices. In addition, determination of the version of firmware or software that may currently be executed on the electronic devices may not be an easy task, especially if such determination must be made with minimal end-user interaction.

When an electronic device manufacturer/supplier wants to upgrade an electronic device user's executable applications, a binary difference file may be distributed from the supplier to the user. The user may then update the executable image with that difference file. Often, the changes required for the upgrade may be small, however, the binary difference file may be very large, and that may cause problems during the upgrading process.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a method for updating firmware/software of an electronic device in a network that comprises the electronic device with an update environment; a distribution environment for transferring data to the electronic device; a communication means for linking the electronic device and the distribution environment; and, a generation environment for generating the data. The update environment of the electronic device may include a download agent for downloading update packages from the distribution environment, and an update agent for adding, deleting or replacing portions of the firmware/software in the electronic device according to the downloaded update package(s). The method of generating an update package for the firmware/software may involve reading the original and new images of the firmware/software;

identifying the objects in the images; comparing the objects of the images; and applying bubbles at the appropriate locations in the original image to align objects with the corresponding objects in the new image, until the objects of the two images line up. The original image may be modified by the applied bubbles. The modified original image and the new image may be used to generate an update package with information regarding the differences between the two images. The update package may be transferred to the electronic device via the distribution environment, through the update environment to modify the original image into the new image.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
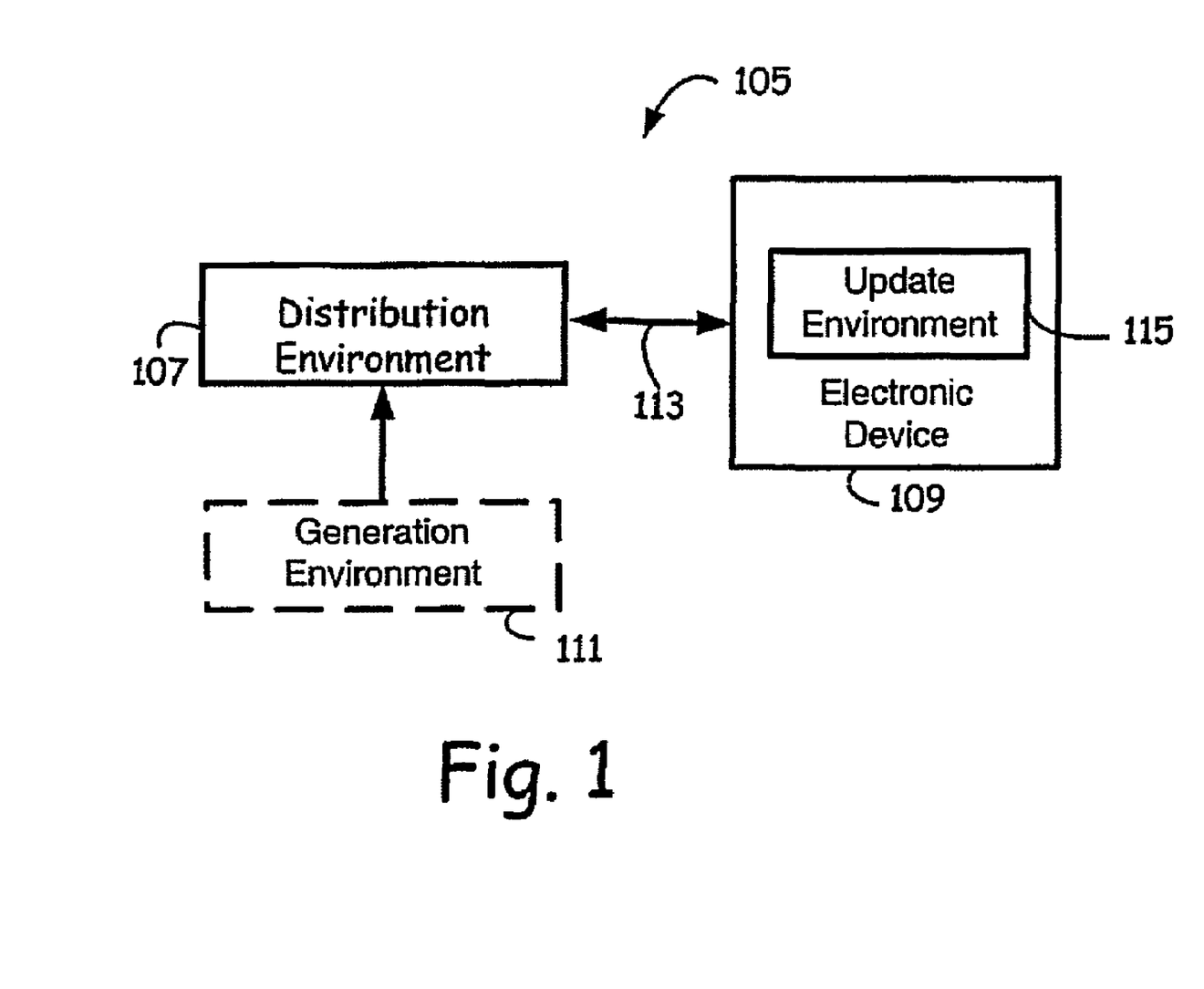
FIG. 1 illustrates a block diagram of an exemplary firmware updating network.

FIG. 1 illustrates a block diagram of an exemplary firmware updating network 105, in accordance with an embodiment of the present invention. The firmware updating network 105 comprises an electronic device 109 with an update environment 115, a distribution environment 107, a generation environment 111, and a communication means 113 linking the electronic device 109 and the distribution environment 107, in accordance with the present invention. The electronic device 109 may be capable of updating its firmware with the assistance of the update environment 115. The electronic device 109 may download update packages from the distribution environment 107 and apply those update packages to upgrade its firmware/software from one version to another.

The generation environment 111 employs a "Bubbles" technique, explained hereinafter, to create efficient and compact update packages. A "Bubbles" information is generated employing the "Bubbles" technique, the generated "Bubbles" information is subsequently sent to the electronic devices 109 as part of an update package. The distribution environment 107 transfers the update packages to the electronic device 109. Correspondingly, the update environment 115 employs the "Bubbles" technique to preprocess the contents of the electronic device 109 utilizing the update packages received from the distribution environment 107. Thus, the "Bubbles" information and other related information are used in preprocessing activities, explained hereinafter, to prepare the electronic device 109 for an update to a different version of its firmware, software and/or content.

The electronic device 109 with its update environment 115 constitutes a fault tolerant system for updating firmware/software in the electronic device 109. The update package is retrieved from the distribution environment 107.

The update environment 115 facilitates the retrieval of the appropriate update package and its download to the electronic device 109. Upon completion of the download, the electronic device 109 verifies receipt of the right update package, validates the update package employing CRC checks, etc., and applies the update package to update the version of firmware/software.

In one embodiment, the update environment 115 receives "Bubbles" information and update instructions as part of an update package. The update environment 115 then performs preprocessing steps employing the "Bubbles" information received. Subsequently, the update environment 115 applies the update instructions to upgrade the modified image.

The update instructions may be a set of instructions and data specified employing a specialized set of instructions in a special format. Update instructions may also be a difference file, whereas the generation environment 111 generates such a difference file. Other forms of update instructions are also contemplated.

In one embodiment, the distribution environment 107 may be a carrier network communicatively coupled to a generation environment 111 that is provided by a manufacturer. The electronic device 109 may be communicatively coupled to the carrier network by a communication means 113. In a related embodiment, the carrier network may comprise an update distribution server, an optional generation environment, an optional provisioning system and an optional billing system.

In another embodiment, the distribution environment 107 may be a cable TV network with set-top-boxes with which the electronic device 109 may interact over a communication means 113. The update packages created by the generation environment 111 may be made accessible to the distribution environment 107.

In one embodiment, the update environment 115 in the electronic device 109 may comprise a download agent for receiving a piece of code from the distribution environment 107, and an update agent that may only delete a portion of the firmware in the electronic device 109 upon successful receipt of the piece of code from the distribution environment 107. In a related embodiment, the update environment 115 may constitute a system for receiving a piece of code from the distribution environment 107 and replacing and/or adding only a portion of the firmware of the electronic device 109 upon receipt of the piece of code.

In one embodiment, the update environment 115 may be capable of successfully completing the firmware update process in the electronic device 109 despite interruptions of an earlier attempt to update the firmware of the electronic device 109. Such interruptions may be caused by a loss of connectivity with the distribution environment 107 or a loss of power in the electronic device 109. In this embodiment, the update environment 115 provides for a fault tolerant mode of firmware updates.

In one embodiment, the download of a piece of code by the update environment 115 from the distribution network 107 may be supported employing one of several data transport mechanisms available to the electronic device 109, where the selection of the appropriate data transport mechanism may be based upon several factors. In a related embodiment, the factor for the selection of the appropriate transport mechanism may comprise the available power in the electronic device 109. In another embodiment, the factor for the selection of the appropriate transport mechanism may comprise the speed of any data transport protocol supported and currently available to the electronic device 109.

In one embodiment, after receiving a piece of code from the distribution environment 107, the electronic device 109 verifies whether that the piece of code is appropriate for update of the firmware prior to performing a firmware update. In a related embodiment, verification that the piece of code is appropriate for update of the firmware may comprise verification of location information, CRC checks, hash value computation and comparison, etc.

In addition to being capable of receiving a piece of code and deleting only a portion of the firmware upon successful receipt, the electronic device 109 may be capable of replacing or adding only a portion of the firmware. If the electronic device 109 determines the piece of code to be unsuitable for one or more reasons, the firmware of the electronic device 109 may not be modified and/or added.

The electronic device 109 may perform over-the-air (OTA) firmware updates in a fault-tolerant manner. The distribution environment 107 may make it possible to conduct over-the-air (OTA) updates to firmware, software and/or content on the electronic device 109 by employing one or more of several available communication protocols. The appropriate communication protocol may be selected based on power consumption, bandwidth considerations, etc.

In one embodiment, the generation environment 111 is employed to generate update packages for firmware and/or software that may run on the electronic device 109. The generated update packages are communicated to the distribution environment 107 for testing, storage and eventual distribution to end-users. In a related embodiment, the generated update packages may be electronically transferred (via ftp, http, or other communication protocols) to the distribution environment 107 (such as a carrier network) from the generation environment 111 (such as a manufacturer's update package generation system). In another related embodiment, the generated update packages may be communicated to the distribution environment 107 employing removable media such as a CDROM. In both these related embodiments, the distribution environment 107 stores the generated update packages until they are accessed by the update environment 115 in the electronic device 109.

In general, the electronic device 109 sends a request to the distribution environment 107 to determine the availability of update packages. However, a request may be remotely triggered. For example, a notification from an external system may trigger the electronic device 109 to request update packages.

In one embodiment, the request may comprise a manufacturer identification, a model identification, and a version number. Other parameters may also be included in requests. The distribution environment 107 receives and processes the request, determines the availability of update packages for the electronic device 109, and sends a response indicating whether update packages are available. When the electronic device 109 receives the availability information, it may proceed to request the initiation of the download of the appropriate update package. The download may be over-the-air (OTA) or via wired communication links.

In addition to being capable of updating firmware, the electronic device 109 may also be capable of updating applications, drivers and other software.

Preprocessing and the "Bubbles" Technique

Preprocessing is a technique that modifies an original version of a firmware image so that it looks more like the new version of the firmware image of an electronic device 109. The modified original version and the new version of the firmware then goes through a generator to produce an update package. This update package is then applied to the firmware in the electronic device 109 to update the firmware in the device from the original to the new version after conducting a preprocessing operation in the electronic device 109. Preprocessing in the present invention is done with the assumption that at least a portion of the objects may appear in the same order in the original and the new images.

In "Branch with Link" Preprocessing, the "Branch with Link" instruction may change according to code shifts in an executable firmware image. "Branch with Link" instructions store relative offsets to other code in the image. If some new information is added between the instruction and its target, then the offset changes accordingly.

When using the "Bubbles" technique, a simple scan of the original image for "Branch with Link" instructions and adjustment of the offset by an amount of shift at that location in the image will usually make the instruction equal to the one in the new image. In cases where constant data that looks like a "Branch with Link" instruction is encountered, running the generator after the preprocessor will recover the proper value.

In "Pointer" Preprocessing, "Pointer" instructions may change according to code shifts in an executable firmware image. "Pointer" instructions load the address of an actual pointer to a register. The value of a pointer at the designated address may be modified if new information is added between the pointer and the location to which it is pointing.

When using the "Bubbles" technique, a simple scan of the original image for "Pointer" instructions and replacement of the offset with the amount of shift at that location in the image will modify the pointer equivalent to the pointer in the new image. In cases where constant data that looks like a "Pointer" instruction is encountered, running the generator after the preprocessing will recover the proper value.

An important part of preprocessing is the "Bubbles" technique. The intent of the "Bubbles" technique is shifting data around in an original image of firmware, inserting spaces and/or removing information to make the data in the original image line up with corresponding data in a new image. The modified original image and the new image may then be sent through a generator to produce an update package. This update package may then be used by an electronic device 109 that has an original image of the firmware, to update the firmware, first by preprocessing (inserting the "Bubbles" into the firmware image) and then by applying the update instructions and data provided in the update package. The "Bubbles" technique of preprocessing assumes that the objects appear in the same order in both the original and the new images.

Auto Bubbles Search (ABS) may be utilized in determining locations of matching objects in the original and the new images. ABS may analyze a constrained range in each image to search for similar patterns in each range. The ranges may be the extent of the entire image, however, better results may be achieved by using regions of the images known to correspond to similar objects. Auto Bubble Search may be used along with an overall bubbles list to remove overlaps in the determined bubbles, which may produce a more optimized bubbles list.

To find patterns in the images, a first step may be to filter the images. For example, for executable code, an effective way to apply a filter may be to disassemble the data and retain only op-codes, which removes address, immediate value, and register information. A next step may be to employ a pattern-matching scheme. Upon iterating through a range in one image, a match may be found in the second image, and a match pattern may emerge as a result. If the length of the match is greater than a certain acceptable value, then it may be considered a match. The aforementioned accepted value may depend on the material being analyzed. For example, setting the acceptable value to thirty-two implies that thirty-two code instruction need to be equivalent for them to be considered matched. Setting the acceptable value to a small number may result in finding a greater number of matches than a case when the acceptable value is set to a larger number. However, setting the acceptable value to a large number may result in overlooking some matches.

Figure 2:
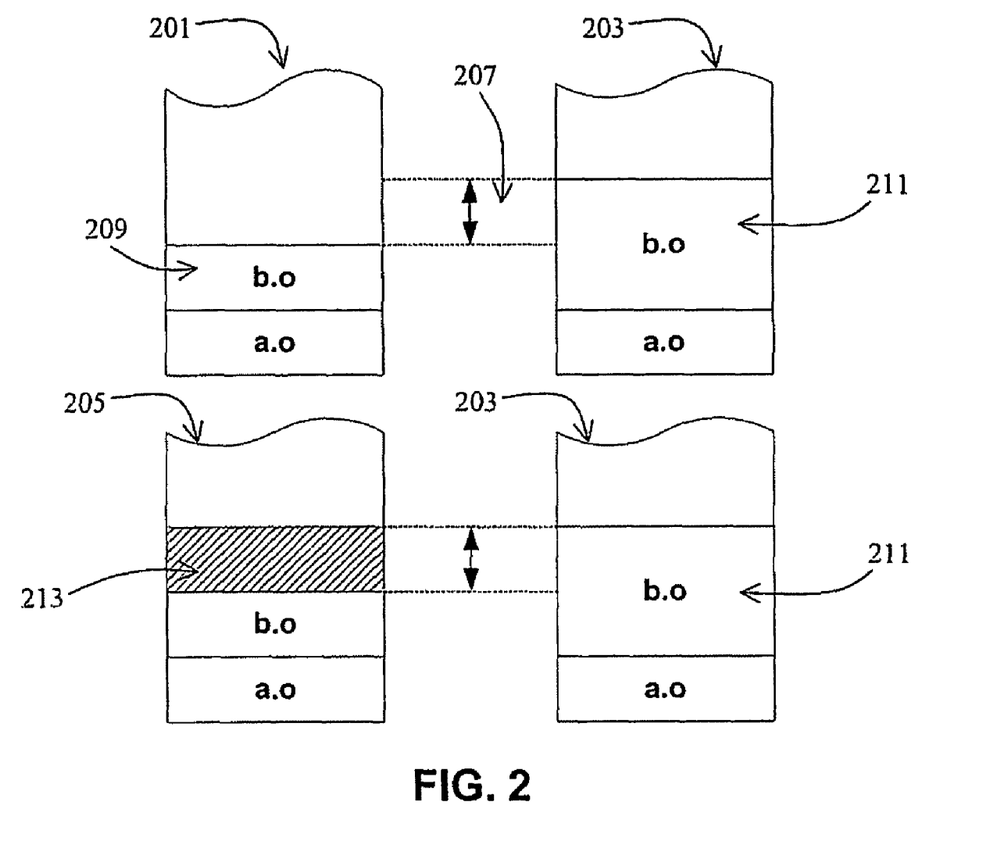
FIG. 2 illustrates an example showing the application of a "Worm" bubble, in accordance with the present invention.

The "Bubbles" inserted into the firmware may take different forms. FIG. 2 illustrates an example showing the application of a "Worm" bubble, in accordance with the present invention. The "Worm" bubble may be used if an object in an image grows in size. In an original image 201, an object 209 (b.o) corresponds to an object 211 (b.o) in the new image 203, the new object 211 being larger than the original object 209. The difference in the size between the two objects is equal to a space 207. Adding a space or bubble 213, equivalent in size to space 207, to the old image 201, shifts the objects after object 209, and creates a preprocessed or modified original image 205. As a result, the objects of the modified original image 205 now line up with the objects of the new image 203.

Figure 3:
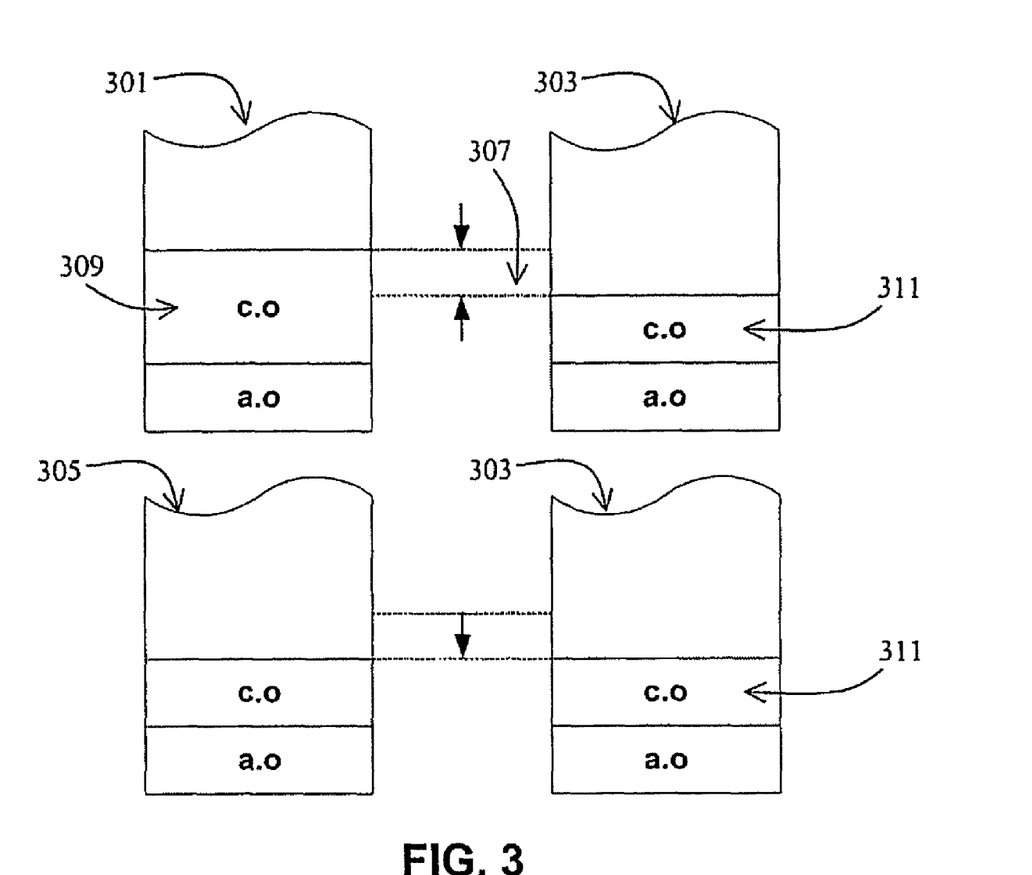
FIG. 3 illustrates an example showing the application of another type of a bubble, a "Black" bubble, in accordance with the present invention.

FIG. 3 illustrates an example showing the application of another type of a bubble, a "Black" bubble, in accordance with the present invention. The "Black" bubble may be used if an object in an image shrinks in size. In an original image 301, an object 309 (c.o) corresponds to an object 311 (c.o) in the new image 303, the new object 311 being smaller than the original object 309. The difference in size between the two objects is equal to a space 307. Removing a space or a bubble of data equivalent in size to space 307 from the original image 301, specifically from object 309, shifts the objects of the original image 301, and creates a preprocessed image 305. As a result, the objects of the modified original image 305 now line up with the objects of the new image 303.

In some cases, an object may be added to an image that might have not been in the original image. This may be resolved using a "Worm" bubble, where the added object may be thought of as an increase in the size from the original image, and a bubble may be added to shift the objects of the original image accordingly, resulting in an alignment of the objects of the original and new images.

In other cases, an object may be removed from an image. Hence the new image may not have a certain object that might have been present in the original image. This may be resolved using a "Black" bubble, where the removed object may be thought of as a reduction in the size of the original image, and a bubble or space may be removed from the original image to shift the objects of the original image accordingly, resulting in an alignment of the objects of the original and new images.

Bubbles may also be used in the volatile memory section, such as RAM. These are called "Virtual" bubbles. The "Virtual" bubbles may be "Worm" or "Black" bubbles, but they may not affect the size of an image. "Virtual" bubbles may be used for reference nodes if, for example, the memory allocation for a variable is increased in a new version of a firmware/software. The image of the executable file is not changed, but the reference nodes refer to the variable section that is changed. The "Virtual" bubbles may then be used to make an appropriate adjustment.

Figure 4:
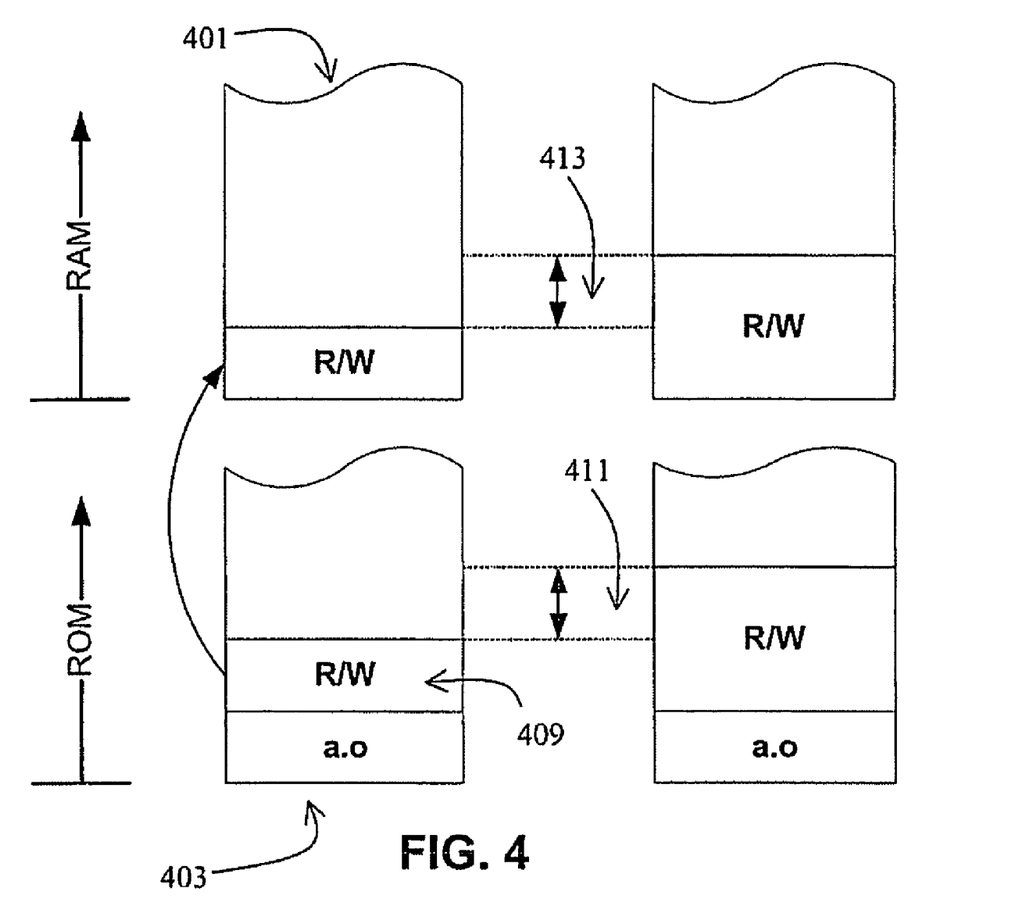
FIG. 4 illustrates an example showing the application of another type of a bubble, a "Mirrored" bubble, in accordance with the present invention.

FIG. 4 illustrates an example showing the application of another type of a bubble, a "Mirrored" bubble, in accordance with the present invention. "Mirrored" bubbles may be used if a R/W relocation section is used in the image. In the illustration of FIG. 4, the ROM address space 403 contains a R/W section 409 to be relocated to a RAM address space 401. A "Virtual" bubble 411 may be created. Other types of bubbles may also be utilized to achieve the R/W relocation from ROM to RAM. However, there is a mirrored section before the R/W section that may be relocated. This mirrored section should be addressed too. The "Mirrored" bubble 413 reflects the location of the bubble in the RAM section.

Figure 5:
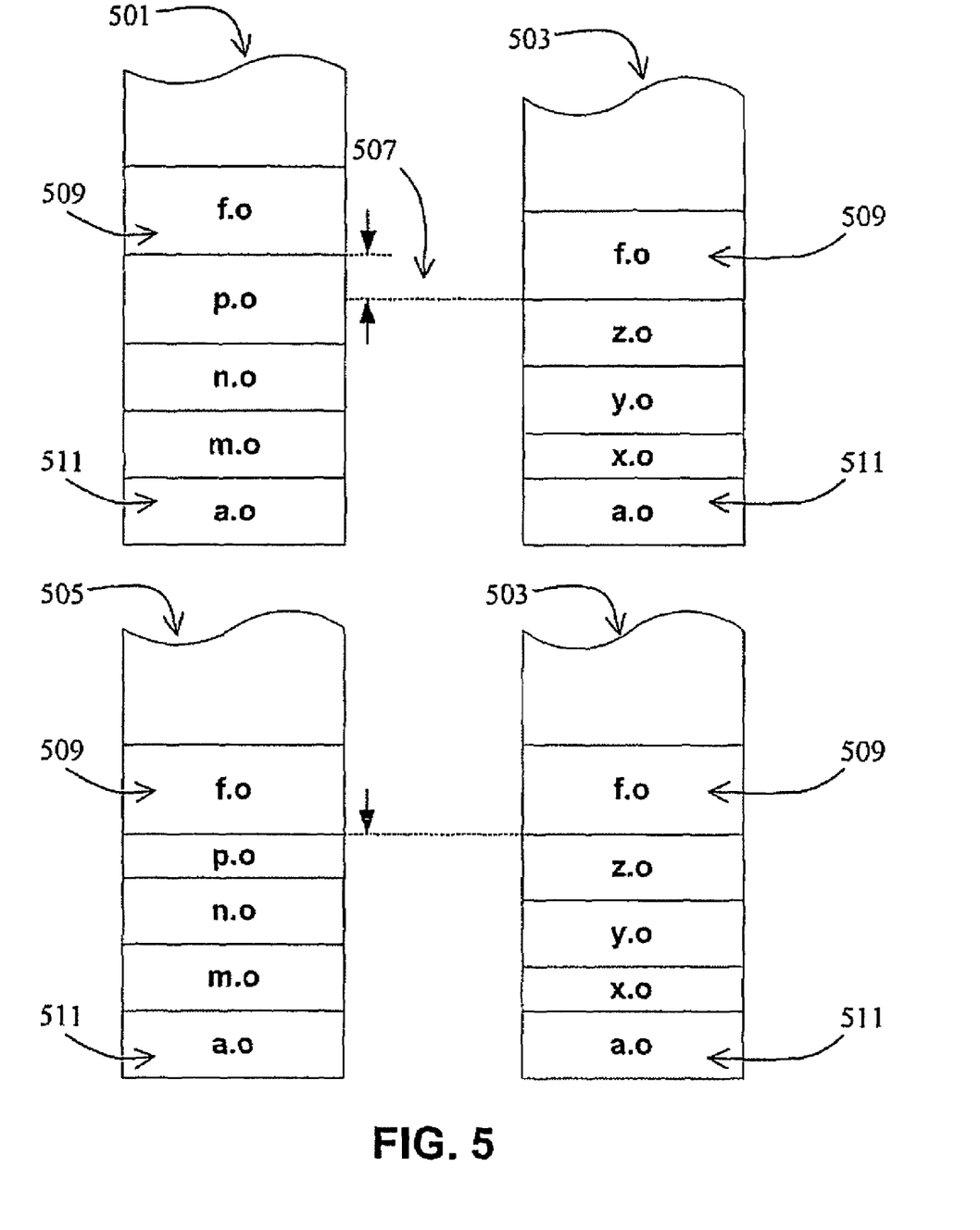
FIG. 5 illustrates the manner in which bubbles may be applied in a Chaotic image, in accordance with the present invention.

FIG. 5 illustrates the manner in which bubbles may be applied in a Chaotic image, in accordance with the present invention. A Chaotic image is one that contains objects that may not be matched between the original image 501 and the new image 503. In order to retain as much information between the two images as possible, a bubble may be applied to align matched locations, such as objects 509 (f.o) and 511 (a.o). Because there are no matched objects between these two objects, a "Black" bubble 507 may be applied to align object 509 in the original and new images, by removing part of object 515 (p.o). As a result, the modified image 505 and the new image 511 have the two common objects 509 and 511 aligned.

Figure 6:
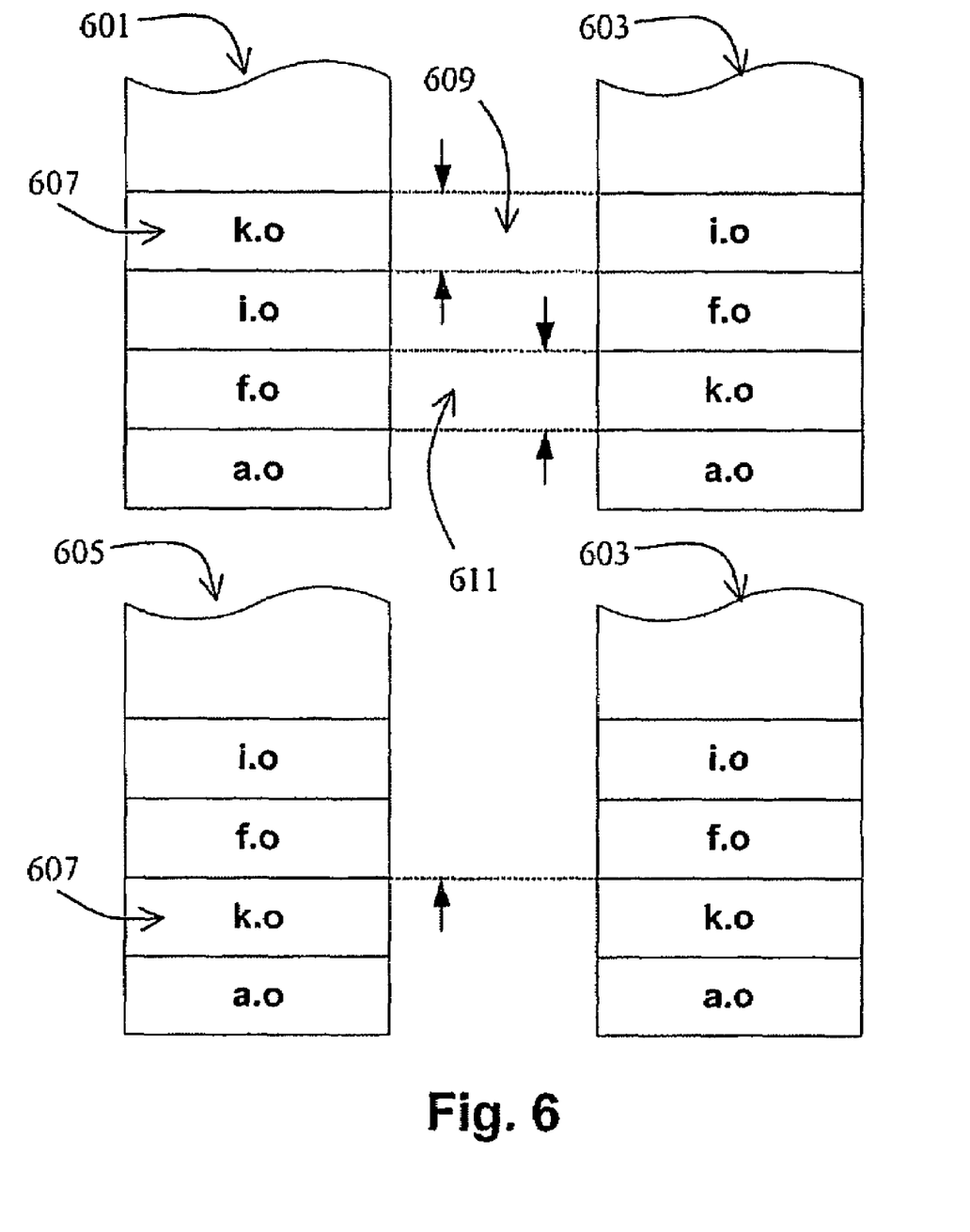
FIG. 6 illustrates utilizing an Annihilation link, in accordance with the present invention.

FIG. 6 illustrates utilizing an Annihilation link, in accordance with the present invention. An Annihilation link may be used if an object 607 (k.o) appears in one location in an original image 601, but at a different location in the new image 603, while objects surrounding the relocated object remain in the same order in both images. An Annihilation link may be used to avoid destroying the source information by creating a "Worm" bubble 611, and a "Black" bubble 609. The Annihilation link then links the "Worm" bubble 611 with the location of object 607, such that instead of using padding bytes in the original image 601 to shift the objects forward, object 607 will be "inserted" or linked to the appropriate location. Hence, when the "Black" bubble 609 is applied to the original image at the original location of object 607, the objects of the original image 601 will shift backward, and the resulting modified original image 605 will look the same as the new image 603.

The "Bubbles" technique is performed in the generation environment, where the original and new binary firmware images are processed. Based on the object positioning, the original image may be modified. If an object in the new image has grown in size, a "Worm" bubble may be applied at the location of the corresponding object in the original image, and an empty space may be added to the end of it, up to the size difference, shifting all objects after the modified object forward in the original image. If an object in the new image has shrunk in size, a "Black" bubble may be applied at the location of the corresponding object in the original image, and data may be removed at the end of the original object up to the size difference, shifting all objects after the modified object backward in the original image. If an object was added to the new image, an associated bubble may be created in the original image at a location corresponding to the location of the object in the new image. If an object was removed from the original image, then objects that appear after it may be shifted backward accordingly.

The net effect of applying bubbles to an image is to correlate the objects of the original image with those of the new image. The modified original image, or the preprocessing image, then ends up looking very similar to the new image. The generator is then run to build an update package from the modified original image to the new image. The update package along with the "Bubbles" information may then be downloaded, through a distribution environment 107, onto an update environment 105 in an electronic device 109. The electronic device 109 may then use the update package and the "Bubbles" information to update its firmware by preprocessing the original image using the "Bubbles information to create a modified original image. The electronic device 109 then uses the modified original image with the difference information (for example, a set of instructions and associated data) from the update package to recreate the new image, and as a result update the firmware.

In many systems, a new version of firmware/software may contains elements or objects that may already exist in the present system. Hence, with the "Bubbles" technique only affecting those objects that may have changed, the resulting update packages is often more size-efficient. As a result, the code that need be updated at the electronic device end may be minimal.

The "Bubbles" information may be two integers for each bubble. The first integer may tell where the bubble may be in the original image, and the second integer may be the size of the bubble. As mentioned hereinabove, the size of bubbles may be positive or negative, depending on the alterations in the image. The preprocessor utilizes the identified bubbles to process the original image. Based on the size of a bubble, padding bytes may be added into or information may be removed from the original image. Once the bubbles are applied to the original image, reference nodes within the image need to be re-linked, and a difference file is generated between the modified original image and the new image. This difference file is then delivered to the user side, where the user applies the difference file to get the new image that the supplier provided.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network for updating contents of memory comprising an existing code version in an electronic device, the network comprising:
    an electronic device including an update environment arranged to first process data representative of shifting of objects within the existing code version to align with locations of corresponding objects in an updated code version, the first process producing a modified existing code version, and to second process the modified existing code version to produce the updated code version;
    a distribution environment for transferring data to the electronic device;
    a communication link for linking the electronic device and the distribution environment; and
    a generation environment for generating the data.

2. The network according to claim 1 wherein the electronic device constitutes a fault tolerant system for updating the contents of the electronic device.

3. The network according to claim 1 wherein the distribution environment is a carrier network.

4. The network according to claim 1 wherein the distribution environment is a cable TV network.

5. The network according to claim 1 wherein the update environment comprises:
    a download agent for receiving data from the distribution environment; and
    an update agent.

6. The network according to claim 5 wherein the update agent deletes a portion of the contents of memory in the electronic device upon successful receipt of data.

7. The network according to claim 5 wherein the update agent replaces a portion of the contents of memory in the electronic device upon successful receipt of data.

8. The network according to claim 5 wherein the update agent adds a portion of the contents of memory in the electronic device upon successful receipt of data.

9. The network according to claim 1 wherein the communication link is a wireless channel.

10. The network according to claim 1 wherein the communication link is a wired link.

11. The network according to claim 1 wherein the data comprises an update package.

12. The network according to claim 1 wherein the generation environment transfers the generated data to the distribution environment electronically.

13. The network according to claim 1 wherein the generation environment transfers the generated data to the distribution environment via removable media.

14. The network according to claim 1 wherein the contents of memory of the electronic device is firmware.

15. The network according to claim 1 wherein the contents of memory of the electronic device is software.

16. A method for updating contents of memory in an electronic device in an updating network having an electronic device, a distribution environment, and a generation environment, the method comprising the steps of:
    (a) reading an original image of the contents of memory of the electronic device;
    (b) reading a new image of the contents of updated memory for the electronic device;
    (c) comparing a location of an object in the original image of the contents and a location of a corresponding object in the new image of the contents, to produce a bubble representative of shift information;
    (d) applying the bubble to the original image of the contents to align the object in the original image of the contents with the corresponding object in the new image of the contents;
    (e) repeating (c) and (d) until all objects of the original image of the contents and the new image of the contents have been compared;
    (f) saving the original image of the contents with the applied bubbles as a modified original image of the contents;
    (g) generating an update package comprising information representing differences between the new image of the contents and the modified original image of the contents, and the applied bubbles;
    (h) transferring the update package to the distribution environment;
    (i) downloading the update package from the distribution environment to the electronic device; and (j) updating the original image of the contents in the electronic device to the new image of the contents, using the update package.

17. The method according to claim 16 wherein a first bubble has a positive size for adding padding bytes into the original image to shift objects forward.

18. The method according to claim 17 wherein a second bubble has a positive size for adding padding bytes into the original image to shift objects forward.

19. The method according to claim 17 wherein a second bubble has a negative size for removing bytes from the original image to shift objects backward.

20. The method according to claim 16 wherein a first bubble has a negative size for removing bytes from the original image to shift objects backward.

21. The method according to claim 20 wherein a second bubble has a negative size for removing bytes from the original image to shift objects backward.

22. The method according to claim 20 wherein a second bubble has a negative size for removing bytes from the original image to shift objects backward.

23. The method according to claim 16 wherein the contents of memory in the electronic device is firmware.

24. The method according to claim 16 wherein the contents of memory in the electronic device is software.

25. The method according to claim 16 wherein the aligned object is a similar portion of binary code between the original image and the new image.

26. A method for updating contents of memory in an electronic device, the method comprising the steps of:
   reading an original image of the contents of memory of the electronic device;
   reading a new image of the contents of updated memory for the electronic device;
   comparing a location of an object in the original image and a location of a corresponding object in the new image, to produce a bubble representative of shift information;
   applying the bubble to the original image to align the object in the original image with the corresponding object in the new image;
   repeating the comparing and applying until all objects of the original image and the new image have been compared and all bubbles applied, to produce a modified original image;
   generating an update package comprising information representing differences between the new image and the modified original image, and the applied bubbles;
   transferring the update package to a distribution environment;
   downloading the update package from the distribution environment to the electronic device; and
   updating the original image in the electronic device to the new image, using the update package.

27. The method according to claim 26 wherein a first bubble has a positive size for adding padding bytes into the original image to shift objects forward.

28. The method according to claim 27 wherein a second bubble has a positive size for adding padding bytes into the original image to shift objects forward.

29. The method according to claim 27 wherein a second bubble has a negative size for removing bytes from the original image to shift objects backward.

30. The method according to claim 26 wherein a first bubble has a negative size for removing bytes from the original image to shift objects backward.

31. The method according to claim 26 wherein the contents of memory in the electronic device is firmware.

32. The method according to claim 26 wherein the contents of memory in the electronic device is software.

33. The method according to claim 26 wherein the aligned object is a similar portion of binary code between the original image and the new image.

* * * * *